United States Patent [19]
Ozeki

[11] 3,807,850
[45] Apr. 30, 1974

[54] HORIZONTALLY ROTATABLE REFLECTOR FOR OVERHEAD SLIDE PROJECTOR

[76] Inventor: Jiro Ozeki, No. 15, 2-chome, Senkawa-cho, Toshima-ku, Tokyo, Japan

[22] Filed: Feb. 9, 1972

[21] Appl. No.: 224,792

[30] Foreign Application Priority Data
Jan. 7, 1972 Japan.................................. 47-4290

[52] U.S. Cl........................ 353/23, 353/25, 353/98
[51] Int. Cl........................ G03b 21/28, G03b 5/00
[58] Field of Search............ 353/23, 24, 50, 51, 81, 353/98, 99

[56] References Cited
UNITED STATES PATENTS
3,269,259   8/1966   Russell.................................. 353/81
3,357,300   12/1967   Cornell................................. 353/99
3,191,491   6/1965   Pignone et al........................ 353/99

Primary Examiner—Louis R. Prince
Assistant Examiner—Steven L. Stephan
Attorney, Agent, or Firm—Waters, Roditi, Schwartz & Nissen

[57] ABSTRACT

In an overhead type slide projector including a reflector projecting the image of a slide picture onto a screen in upright position, the reflector is carried by a holder which is horizontally rotatable about the vertical optical axis of converging light beams from a condenser lens means. The holder includes a horizontal axis about which the reflector can vertically swing.

3 Claims, 6 Drawing Figures

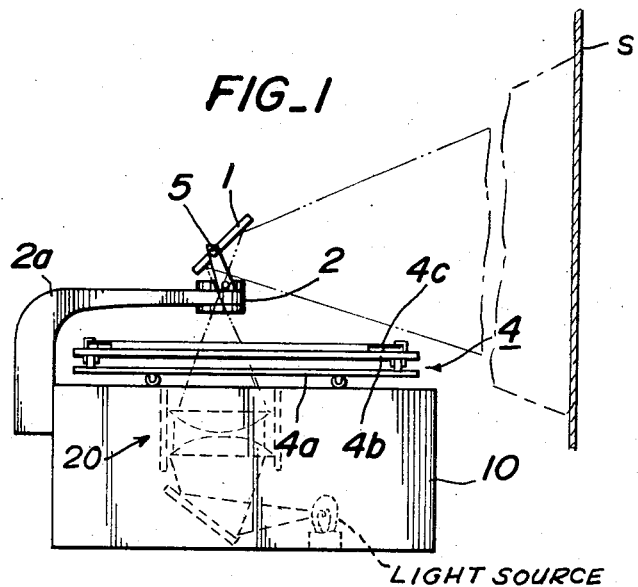
FIG_1
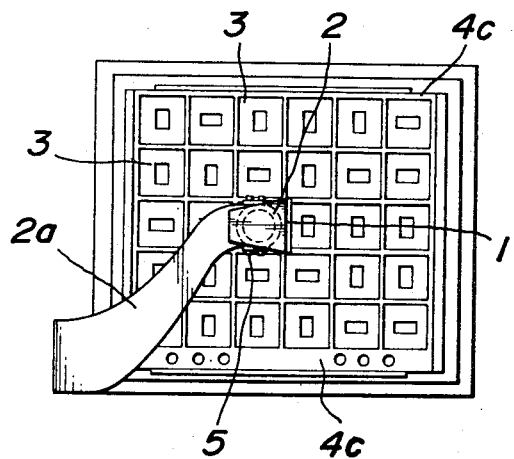
FIG_2

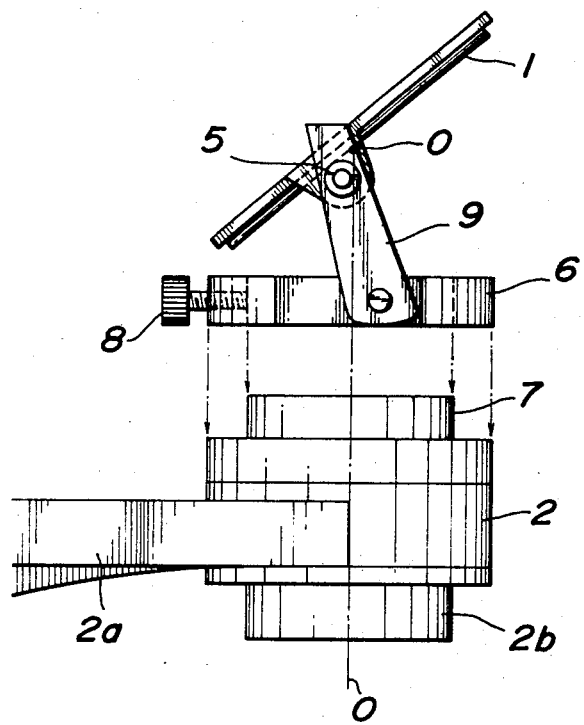
FIG_3
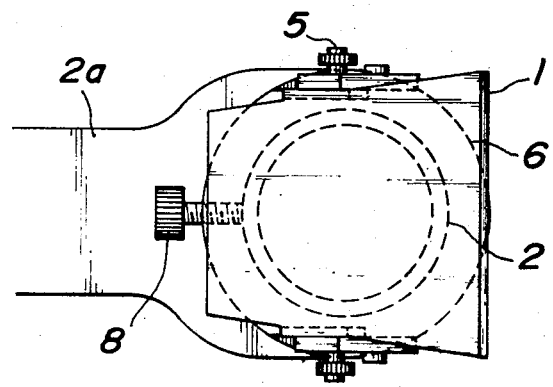
FIG_4

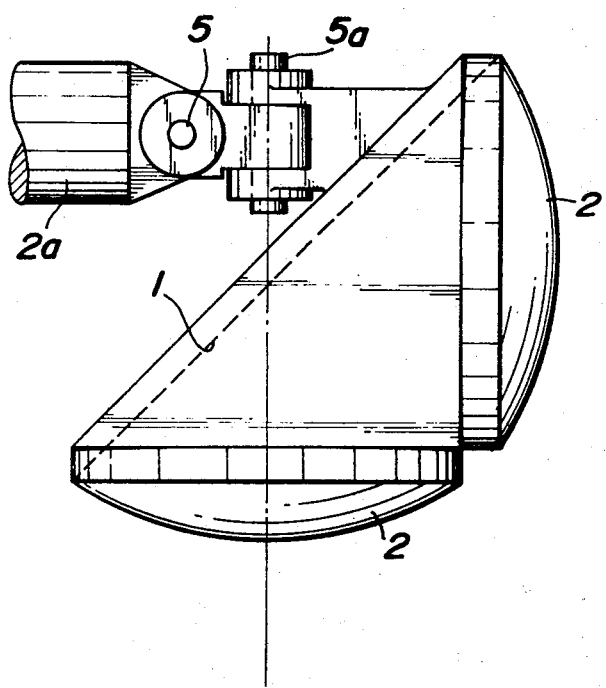

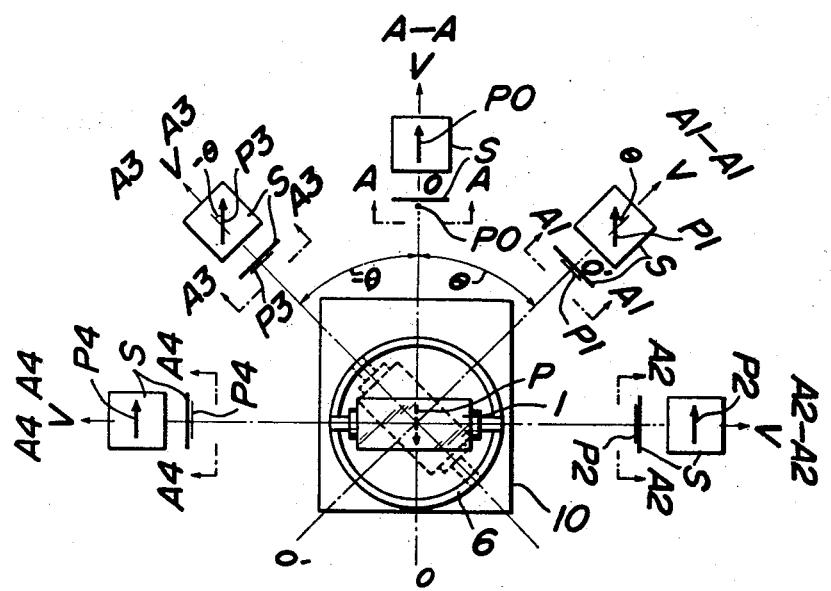
FIG_6

3,807,850

HORIZONTALLY ROTATABLE REFLECTOR FOR OVERHEAD SLIDE PROJECTOR

BACKGROUND OF THE INVENTION

1. Field of the Invention

This invention relates to an overhead type slide projector, and more particularly to a horizontally rotatable reflector to be incorporated in an overhead type slide projector for enhancing the operating freedom of the projector.

2. Description of the Prior Art

There are a number of different types of overhead slide projectors, in which a vertically swingable reflector is used for directing image-carrying light beams from a projecting lens to a screen in an overhead fashion. Such vertically swingable reflector serves to simplify the vertical adjustment of the position of an image projected on the screen. For rotational adjustment of the image on the screen relative to the vertical, however, it has been necessary to rely on other adjusting means; for instance, adjustment of the inclination of the projector itself, so as to project the image in correct upright position on the screen. Some of the conventional overhead type slide projectors have adjusting screws rotatably secured to the bottom wall thereof for facilitating the inclination of the slide projector itself.

Generally speaking, each slide has an axis of picture projection; namely a vertical axis or a horizontal axis which should be projected vertically or horizontally on the screen, respectively. In order to project the vertical axis of a slide picture on the screen in a vertical position, the slide picture must be held by the slide projector with a certain predetermined angular relation with respect to the optical axis of the projector. If such angular relation between the optical axis of the projector and the axis of the slide picture mounted on the projector is not properly maintained, the slide picture is projected on the screen in an improper position, e.g., the projected image of a vertical picture may be inclined relative to the vertical. With conventional overhead type slide projectors, in order to correct such improper angular relation between the slide projector optical axis and the axis of a slide, it has been necessary to remove the improperly disposed slide from the slide projector and to re-insert the slide in the slide projector in proper angular relation with respect to the optical axis of the latter.

The aforesaid adjustment of the inclination of the conventional slide projector and the removal and re-insertion of an improperly positioned slide relative to the slide projector, for achieving proper slide posture, are complicated and time-consuming.

SUMMARY OF THE INVENTION

Therefore, an object of the present invention is to mitigate the aforesaid difficulties of the conventional overhead type slide projectors, by providing an improved overhead type slide projector. According to the present invention, there is provided a reflector for overhead type slide projectors, which reflector is vertically swingable about a horizontal axis and horizontally rotatable about a vertical optical axis of converging light beams from a condenser lens means of the slide projector. A slide picture to be projected is placed in the path of the converging light beams at an intermediate position between the condenser lens means and the reflector. In response to the horizontal rotation of the reflector about the vertical optical axis of converging light beams, the image of the slide picture on the screen rotates about the optical axis of the image-carrying light beams. As a result, the position of the image projected on a screen, relative to the vertical, can easily be adjusted simply by rotating the reflector. If such adjustment of the position of the projected image on the screen results in an excessively large displacement of the projected image from its proper position, the horizontal projecting direction of the projector may be corrected by turning the projector itself. Thus, the need of adjusting the slide projector inclination per se is completely eliminated.

Furthermore, with the horizontally rotatable reflector according to the present invention, a slide which is mounted on the projector in an improper angular relation with respect to the optical axis of the projector can be projected on a screen in a proper position by simple adjustment of the reflector. Thus, the need of correcting the slide orientation on the projector involving the removal and re-insertion of the slide relative to the projector can completely be eliminated.

BRIEF DESCRIPTION OF THE DRAWING

For a better understanding of the invention, reference is made to the accompanying drawings, in which:

FIG. 1 is a side view of an overhead type slide projector which incorporates a horizontally rotatable reflector according to the present invention;

FIG. 2 is a plan view of the projector;

FIG. 3 is an enlarged side view of the reflector and a holder thereof, which are used in the projector of FIG. 1;

FIG. 4 is a plan view of FIG. 3;

FIG. 5 is a side view of a different embodiment of reflector according to the present invention; and FIG. 6 is a diagrammatic illustration of the operative principles of a horizontally rotatable reflector, according to the present invention.

Like parts are designated by like numerals throughout the drawings.

DESCRIPTION OF THE PREFERRED EMBODIMENT

Referring to FIGS. 1 and 2, there is shown an overhead type slide projector, which uses a horizontally rotatable reflector according to the present invention. A plurality of slides 3, such as color transparencies mounted on paper frames, are held by a slide file sheet 4c in a lattice disposition. An example of such slide filing sheet is disclosed in U.S. Pat. No. 3,466,126, which was granted to Yoshichika SAKAMOTO on Sept. 9, 1969. The slide file sheet 4c is mounted on a slide sheet holder 4 comprising two carrier members 4a and 4b, which carrier members are movable in two mutually perpendicular directions in a substantially horizontal plane, respectively. By suitably moving the two carrier members 4a and 4b in the two directions, any desired one of the slides 3 can be aligned with the optical axis of converging light beams from a condenser lens means 20 located within a body 10 of the projector.

The particular structure of the slide file sheet 4c and the manner in which the individual slides 3 are placed on the slide projector are not material to the present invention. For instance, an overhead slide projector with a slide holder capable of handling only one comparatively large slide at a time may also incorporate therein a horizontally rotatable reflector according to the present invention.

The body 10 of the projector includes a condenser lens means 20 which provides converging light beams directed upwards from the top surface of the body 10 at right angles thereto. That portion of the top surface of the body 10 which passes the converging light beams should preferably be transparent, and the transparent portion is preferably surrounded by translucent portions. The center of a slide picture to be projected should be aligned with the vertical optical axis of such light beams.

Referring to FIGS. 1 to 4, a projecting lens means 2 is carried by an arm 2a extending from the body 10, in such a manner that the projecting lens means 2 has its optical axis aligned with the aforesaid vertical optical axis 0—0 of the upward-directed converging light beams from the body 10 of the slide projector. The arm 2a also carries a reflector 1, which is swingable about a horizontal axis 5 passing through a rotatable shaft.

In the illustrated embodiment, the slide 3 to be projected is placed between the condenser lens means and the projecting lens means 2. Thus, image-carrying light beams are formed at the slide and the projecting lens means 2 acts to focus the image as carried by the light beams. The image-carrying light beams then become incident on the reflector 1 and directed to a screen 5 so as to produce a focussed image of the slide picture thereon.

It has been well known to those skilled in the art that, with a vertically swingable reflector 1, the position of the slide picture image on the screen can easily be adjusted in the vertical direction, simply by swinging the reflector 1. With the conventional swingable reflector, however, it is impossible to adjust the inclination of the image on the screen, relative to the vertical, by controlling the reflector 1 alone. In fact, with conventional slide projectors, one or more adjusting screws are often used at the bottom of a projector body. When an image projected on the screen is so inclined relative to the vertical that correction is necessary, the desired correction of the image position on the screen can be effected by turning the adjusting screws thus provided. Thereby, the inclination of the projector itself is regulated by the adjusting screws, in order to correct the inclination of the projected image on the screen. Such adjustment of the projector body by the adjusting screws is tedious and time consuming.

As pointed out in the foregoing, with a conventional vertically swingable reflector, once a slide is inserted in a slide projector at a wrong angular disposition relative to the optical axis of the projector, the only way to correct the wrong disposition is to remove the slide from the projector and re-insert it in the projector in a correct position. Such removal and subsequent re-insertion constitute a complicated procedure and consume a considerably long time to accomplish.

The inventor has noted that, if the reflector 1 of FIGS. 1 to 4 is allowed to rotate about the vertical axis 0—0 of the converging light beams from the condenser lens means, the optical axis of the reflected beams swings in response to such rotation of the reflector 1, while causing the light beams to rotate about the optical axis thereof.

Referring to FIGS. 3 and 4, an annular shoulder portion 7 is formed at the top end of the projecting lens means 2, while exactly aligning the center of the annular shoulder 7 with the vertical optical axis 0—0. A ring member 6 fits on the annular shoulder portion 7 in such a manner that the ring member 6 can horizontally rotate about the aforesaid vertical axis 0—0 of the converging light beams, and the surface engagement between the annular shoulder portion 7 and the ring member 6 acts to guide such horizontal rotation of the ring member 6. A pair of brackets 9 are integrally formed with the ring member 6 so as to extend uprightly from diametrically opposite portions of the ring member 6. The horizontal axis about which the reflector 1 vertically swings is defined across the two brackets. In the embodiment of FIGS. 3 and 4, the horizontal axis is formed by a pair of aligned pins 5 which rotatably hold the reflector 1. A fastening screw 8 is threadedly mounted on the ring member 6 so as to hold the ring member 6 relative to the projecting lens means 2 at any desired angular position by tightening the fastening screw 8 against the annular shoulder portion 7 of the projecting lens means 2.

The total weight of the ring member 6 with the fastening screw 8, the brackets 9, the reflector 1, and the pins 5 defining the horizontal axis of vertical swinging of the reflector 1 is so light that the reflector 1 can easily be rotated about the vertical axis 0—0 of the converging light beams from the condenser lens means, simply by operating it with the finger tips of the user. The reflector 1, of course, easily swings about the horizontal axis defined by the two pins 5, as in the case of any known reflectors of conventional overhead type projectors.

The effect of the vertical swing of the reflector 1 about the horizontal axis is the same as that of conventional reflectors; namely, the vertical position of a slide picture image can be adjusted by vertically swinging the reflector 1.

The effect of the horizontal rotation of the reflector 1 about the vertical optical axis 0—0 of the converging light beams, according to the present invention will now be described by referring to FIG. 6. FIG. 6 is a schematic plan view illustrating the relation between a slide projector of the invention and screens S on which the image of a slide picture is projected. For simplicity, the arm 2a and the projecting lens means 2 of the slide projector are not shown. All the screens S are assumed to be disposed vertically, and the images projected on those screens S are shown in elevations of the screens S, taken from the directions of the arrows A—A, A1—A1, A2—A2, A3—A3, and A4—A4, respectively.

In FIG. 6, let it be assumed that, when the reflector 1 is kept at the solid line position, an upright image P0 of a slide picture P is projected on the screen S which is disposed in the direction of the optical axis 0—0 of the figure. When the reflector 1 is horizontally rotated by an angle $\theta$ from the solid line position to the dotted line position of FIG. 6, the optical axis of the light beams from the reflector 1 horizontally sweeps by the same angle $\theta$ from the position 0—0 to another position 0'—0' of the figure. At the same time, the incident light beams to the reflector 1 rotate about the optical axis thereof by the same angle $\theta$. As a result, an image P1 of the slide picture P, as projected on the screen S located on the optical axis 0'—0', is inclined by an angle θ relative to a vertical V on the screen, as shown in the elevation A1—A1 of FIG. 6. During the change of the inclination of the image of the slide picture P from P0 to P1, in response to the horizontal rotation of the reflector 1 as shown in FIG. 6, the slide picture P itself is held stationary and the vertical axis of the converging light beams from the condenser lens means of the projector is held stationary, as shown in FIG. 3. Thus, the reflector 1 acts to turn the vertical optical axis 0—0 of the converging light beams from the condenser lens means to different horizontal directions, such as the directions 0—0 and 0'—0' of FIG. 6, depending on the angular position of the reflector 1 about the vertical optical axis.

If the reflector 1 is horizontally rotated by an angle θ in an opposite direction to the aforesaid direction 0'—0', an image P3 of the slide picture P on the screen S will be inclined by an angle θ in the opposite direction to the aforesaid image P1, as shown in the elevation A3—A3 of FIG. 6.

Furthermore, if the reflector 1 is horizontally turned by 90 degrees from the solid line position of FIG. 6 in either direction, the image of the slide picture P is turned by 90 degrees relative to a vertical V, as shown by images P2 and P4 of the figure.

The aforesaid effect of the horizontal rotation of the reflector 1 can be used in two ways; namely, for fine adjustment of the image position, and for 90 degree adjustment of the image position. More particularly, if the projector body 10 is not held exactly horizontally, for one reason or another, the image projected on the screen S may not be exactly vertical or horizontal. By fine adjustment of the reflector 1 with the finger tips of the user, the image position can easily be adjusted to the desired exact vertical or horizontal position. The image of the desired horizontal or vertical position can easily be brought to the center of the screen S, simply by turning the projector body 10. Thus, the need for tedious and time-consuming adjustment of the projector body inclination, such as by turning adjusting screws, can completely be eliminated.

If a slide picture is projected on a screen in a 90 degrees turned position, e.g., if a vertically oriented picture is projected in a horizontal position by mistake, the reflector 1 is turned 90 degrees to orient the image of the slide picture in proper position, e.g., the image of a vertical picture in vertical position. With conventional slide projectors, such as those using slide file sheets, it has been necessary to remove any wrongly disposed slide from the projector and re-insert the slide in the projector in correct orientation. The use of the horizontally rotatable reflector, according to the present invention, serves to eliminate the need for such removal and re-insertion of wrongly oriented slide or slides for proper projection thereof.

FIG. 5 illustrates another embodiment of the present invention. The reflector 1 of FIG. 5 is rotatably carried by an arm 2a extending from a projector body (not shown) through a pair of rotary shafts; namely, a horizontal rotary shaft 5' and a vertical rotary shaft 5a to be aligned with the vertical optical axis of converging light beams from a condenser lens means. Thus, the reflector 1 can vertically swing about the horizontal shaft 5' and horizontally rotate about the vertical shaft 5a.

With such vertical swing and horizontal rotation, the reflector 1 of FIG. 5 ensures the same improvement of the overhead slide projector, as the improvement which has been described in detail hereinbefore by referring to FIGS. 1 to 4 and 6.

It should be noted in FIG. 5 that the projecting lens means of this embodiment is not movable relative to the reflector 1, but it comprises two projecting lens elements 2 representing a pair of meniscus lenses disposed at right angles with each other so as to become outwardly convex.

As described in the foregoing disclosure, according to the present invention, there is provided a horizontally rotatable reflector for overhead slide projectors which reflector is rotatable in two directions, vertically and horizontally. Thereby, the freedom or ease of slide projector operation is greatly enhanced.

I claim:

1. An overhead slide projector for projecting an upright image of a slide picture onto a screen, said projector comprising a housing carrying a light source with a condenser lens means producing vertical converging light beams, a reflector disposed in the path of the vertically directed converging light beams from the condenser lens means, a slide holding means disposed between the condenser lens means and said reflector for support of an array of slides which may have different orientation, said slide holder means being relatively displaceable to position a slide in the path of the vertical conveying light beams to produce an image of such slide, an arm extending from said housing, a holder for said reflector, a first support means mounted on said arm for rotation about a first axis, and a second support means mounted on the first support means for rotation about a second axis which is spaced from the first axis and is perpendicular thereto, one of said axes being horizontal and the other vertical, said holder for the reflector being connected to the second support means and thereby being capable of separate rotation about each said axis individually to deflect the vertical light beams into horizontal position by angular adjustment about the horizontal axis while enabling the angular orientation of the image of the slide relative to the vertical to be adjusted by rotation of the reflector holder about the vertical axis.

2. An overhead slide projector according to claim 1, wherein said first support means comprises a ring including studs extending upwardly, said ring being mounted on said arm for rotation about the vertical axis so as to be horizontally rotatable about the optical axis of the vertical light beams, said second means being mounted on said studs in a vertically swingable manner about a horizontal axis so as to enable the reflector to deflect light beams coming upwards through said ring.

3. An overhead slide projector according to claim 1, wherein said first means is pivotably connected to said arm about a horizontal axis, second means comprising a sleeve to which the reflector is rigidly secured, said sleeve being mounted on said first means for rotation about a vertical axis which is coaxially aligned with the vertical axis of the light beams so as to be horizontally rotatable about the vertical optical axis.

* * * * *